(12) United States Patent  (10) Patent No.: US 9,113,734 B1
Cianca et al.  (45) Date of Patent: Aug. 25, 2015

(54) SYSTEM FOR APPLYING BUTTER TO CORN ON THE COB

(71) Applicants: Victor S. Cianca, Bethel Park, PA (US); Steven G. Cianca, Bethel Park, PA (US)

(72) Inventors: Victor S. Cianca, Bethel Park, PA (US); Steven G. Cianca, Bethel Park, PA (US)

( * ) Notice: Subject to any disclaimer, the term of this patent is extended or adjusted under 35 U.S.C. 154(b) by 271 days.

(21) Appl. No.: 13/874,621

(22) Filed: May 1, 2013

(51) Int. Cl.
*A23G 3/24* (2006.01)
*A47G 19/00* (2006.01)

(52) U.S. Cl.
CPC ............... *A47G 19/303* (2013.01); *A23G 3/24* (2013.01)

(58) Field of Classification Search
CPC ......... A23G 3/24; A23G 9/245; A23B 5/065; A47G 19/303; A23L 1/0047; A23L 1/0058
USPC ............ 99/494, 516, 534; 118/26, 31, 30, 27, 118/28, 29, 13; 401/12, 11, 23; 210/470; 30/325; D07/667, 670, 691
See application file for complete search history.

(56) References Cited

U.S. PATENT DOCUMENTS

| D157,183 S | 2/1950 | Newell | |
|---|---|---|---|
| 2,585,174 A * | 2/1952 | Rosendahl | 220/574 |
| 2,730,878 A | 1/1956 | Incorvaia | |
| 2,808,020 A | 10/1957 | Arvidson | |
| 3,308,269 A | 3/1967 | Stocker | |
| 3,735,487 A | 5/1973 | Wojcik | |
| 3,736,152 A * | 5/1973 | Turner | 426/302 |
| 4,301,762 A | 11/1981 | Burnett, Jr. | |
| 4,963,045 A | 10/1990 | Willcox | |
| 5,858,089 A | 1/1999 | Martinovic | |
| 7,150,574 B1 | 12/2006 | Cerqua | |
| 7,396,176 B2 | 7/2008 | Schoemer | |
| 9,009,980 B2 * | 4/2015 | Dunbar, Jr. | 30/325 |

OTHER PUBLICATIONS www.etsy.com, Vintage Glass Beaker Corn Dipper, Apr. 22, 2013.

* cited by examiner

*Primary Examiner* — Reginald L Alexander

(57) ABSTRACT

A system for applying butter to corn on the cob features a corn on the cob ladle with an elongated ladle handle. A hook is located on a handle first end. The corn on the cob ladle features an elongated trough having a trough bottom perpendicularly located on a handle second end. A plurality of apertures is located on a trough bottom. The system features an elongated corn dipping tank with a lid pivotally located thereon and a tank front side having a window centrally located therein.

5 Claims, 5 Drawing Sheets

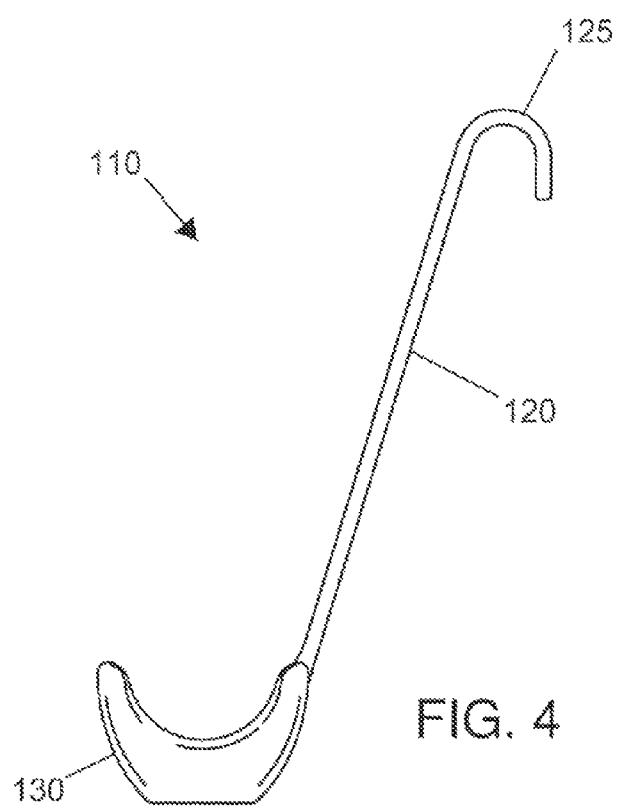
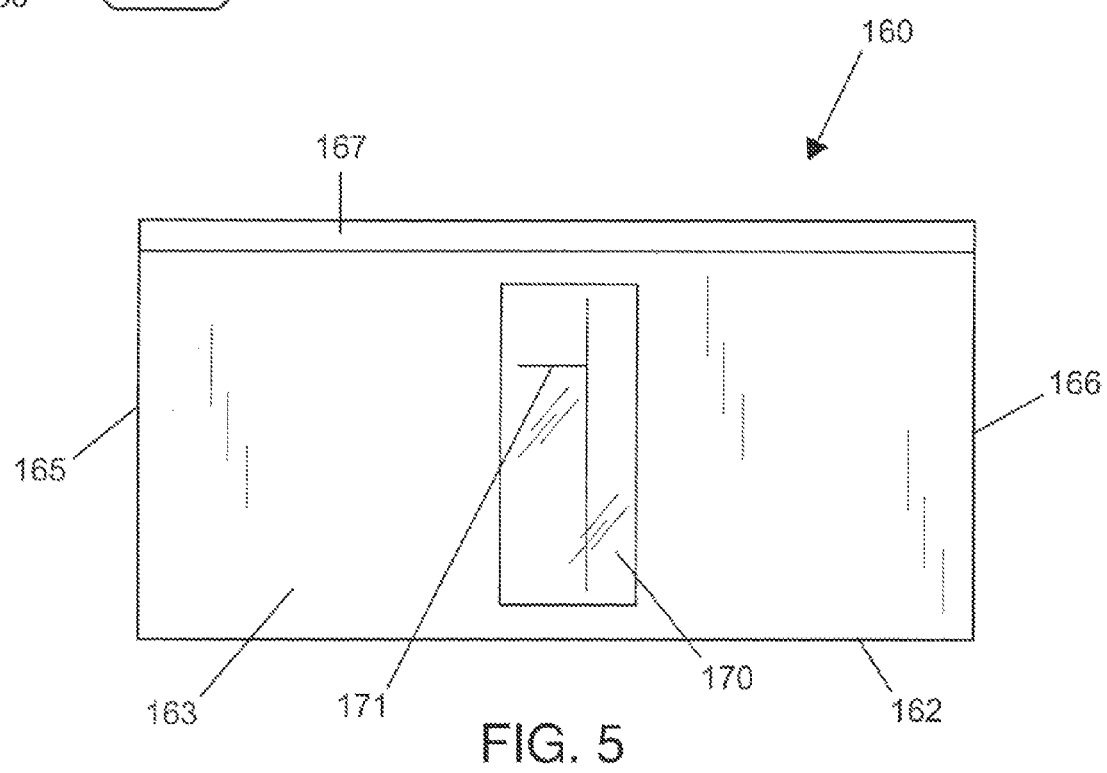

SYSTEM FOR APPLYING BUTTER TO CORN ON THE COB

FIELD OF THE INVENTION

The present invention relates to cooking utensils, or more specifically, cooking utensils used in the preparation of corn on the cob.

BACKGROUND OF THE INVENTION

Corn on the cob has been prepared in many ways and eaten for centuries. A common way to serve corn on the cob involves basting with butter. Basting corn on the cob can often become messy or even hazardous. The present invention features a system for applying butter to corn on the cob to minimize the mess and hazards associated with rubbing butter on a piece of hot corn on the cob.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for applying butter to corn on the cob. In some embodiments, the system comprises a corn on the cob ladle comprising an elongated ladle handle. In some embodiments, a hook is located on a handle first end. In some embodiments, the corn on the cob ladle comprises an elongated trough having a trough bottom perpendicularly located on a handle second end. In some embodiments, a plurality of apertures is located on a trough bottom. In some embodiments, the system comprises an elongated corn dipping tank comprising with a lid pivotally located thereon and a tank front side having a window centrally located therein.

BRIEF DESCRIPTION OF THE DRAWINGS

FIG. 4 shows a side view of the corn on the cob ladle of the present invention.
FIG. 5 shows a front view of the dipping tank of the present invention.

DESCRIPTION OF PREFERRED EMBODIMENTS

Figure 1:
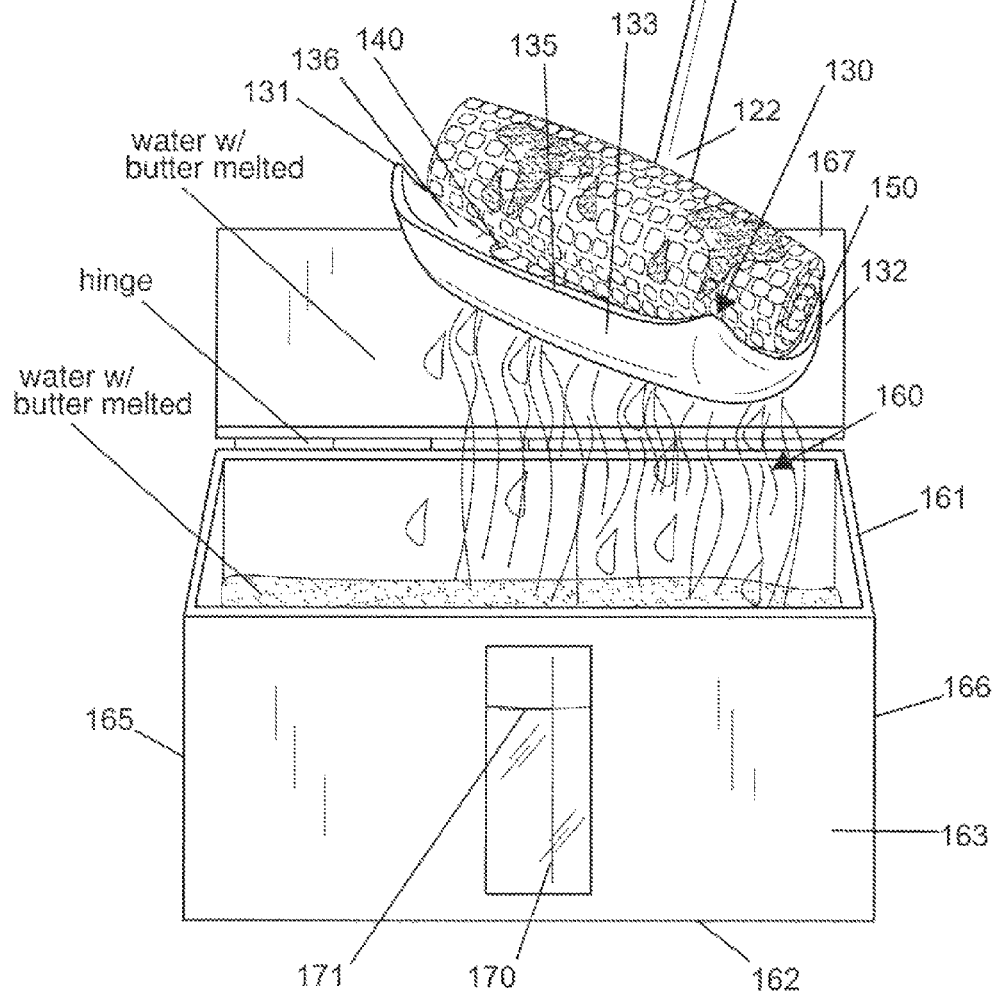
FIG. 1 shows a perspective view of the present invention.
Figure 2:
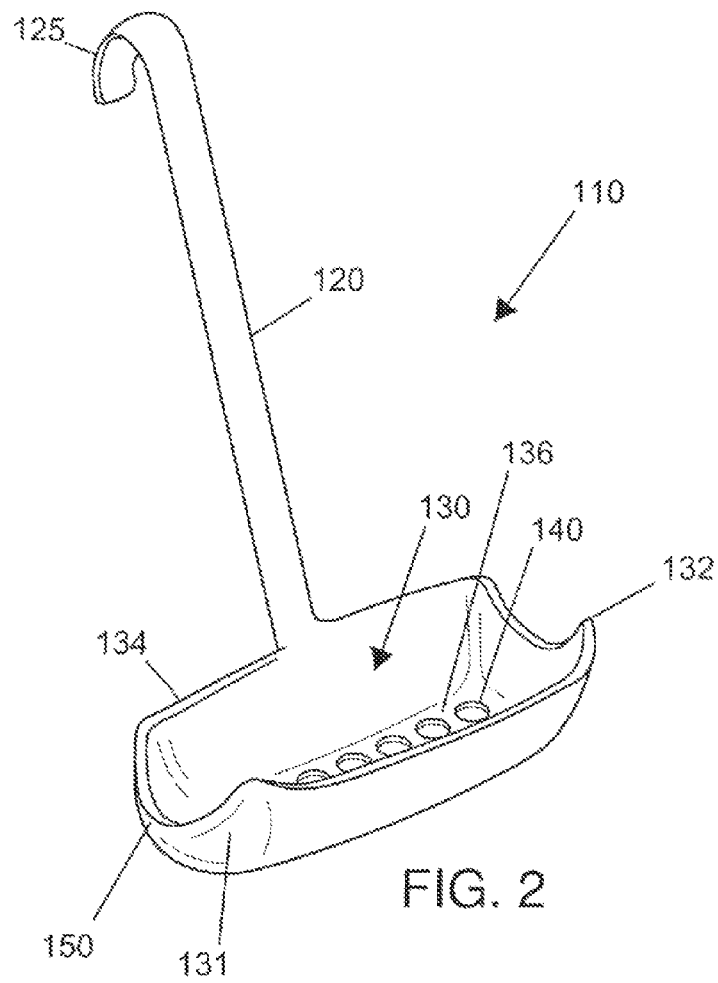
FIG. 2 shows a perspective view of the corn on the cob ladle of the present invention.
Figure 3:
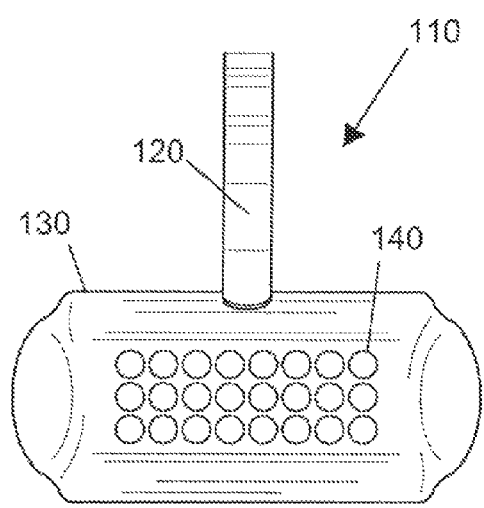
FIG. 3 shows a top view of the corn on the cob ladle of the present invention.
Figure 6:
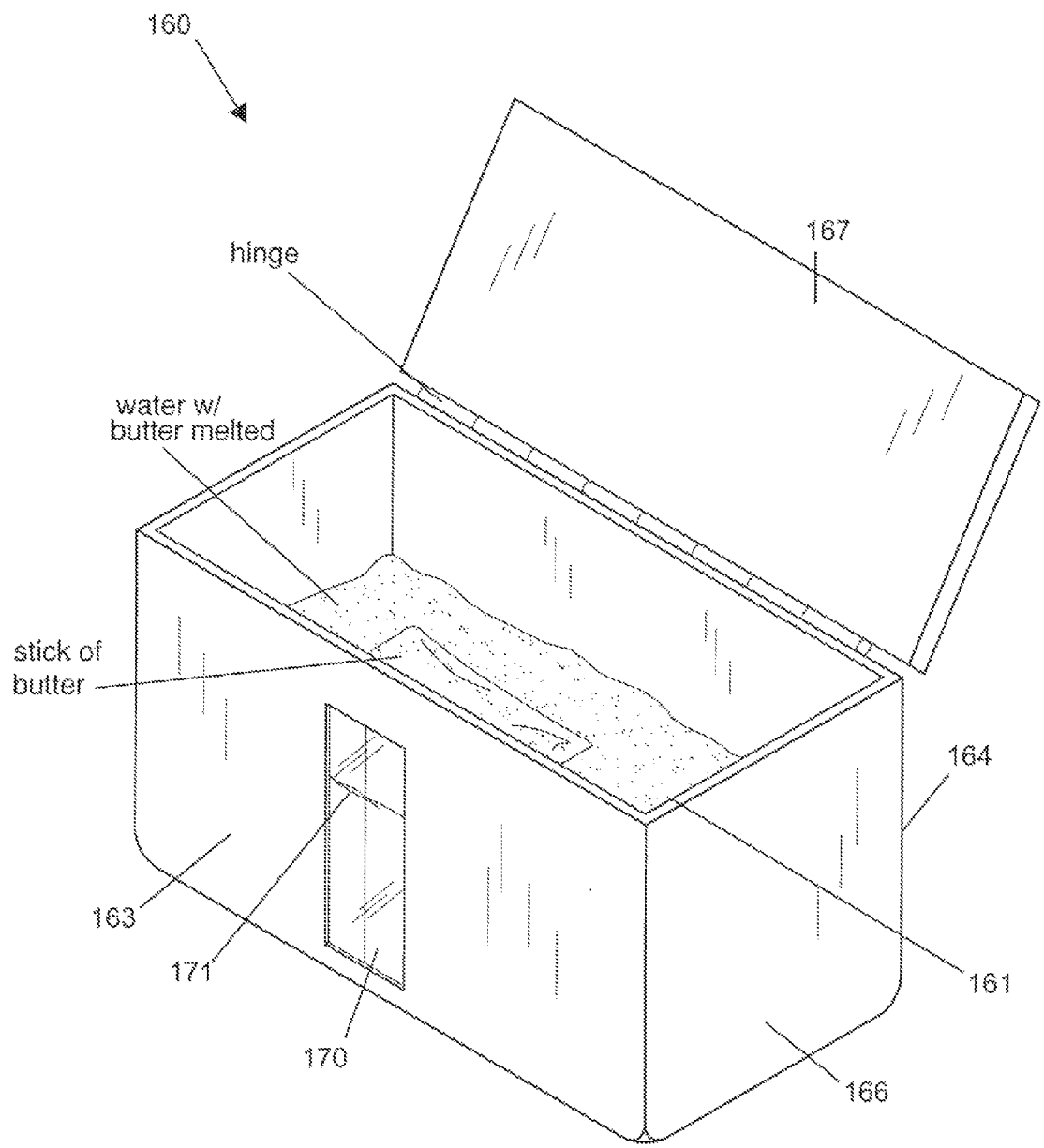
FIG. 6 shows a perspective view of the dipping tank of the present invention.
Figure 7:
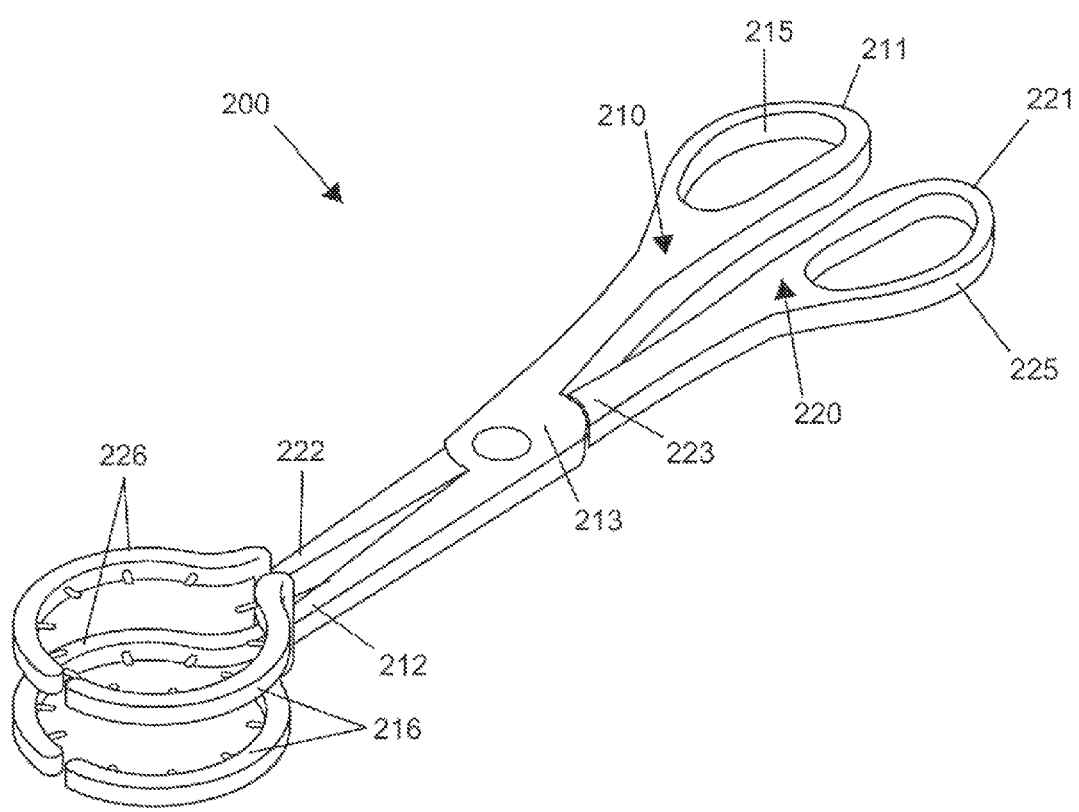
FIG. 7 shows a perspective view of an alternate embodiment of a component of the present invention featuring a corn on the cob clamp.

Following is a list of elements corresponding to a particular element referred to herein:
100 Butter application system
110 Corn on the cob ladle
120 Ladle handle
121 Handle first end
122 Handle second end
125 Hook
130 Trough
131 Trough first side
132 Trough second side
133 Trough front
134 Trough back
135 Trough top
136 Trough bottom
140 Aperture
150 Notch
160 Dipping tank
161 Tank top
162 Tank bottom
163 Tank front side
164 Tank back side
165 Tank first side
165 Tank second side
167 Lid
170 Window
171 Water fill line
200 Corn on the cob clamp
210 First elongated clamp
211 First handle first end
212 First handle second end
213 First handle midsection
215 First finger loop
216 First corn clamp
220 Second elongated clamp handle
221 Second handle first end
222 Second handle second end
223 Second handle midsection
225 Second finger loop
226 Second corn clamp Referring now to FIG. 1-7, the present invention features a butter application system (100) for applying butter to corn on the cob. In some embodiments, the system (100) comprises a corn on the cob ladle (110) comprising an elongated ladle handle (120) having a handle first end (121) and a handle second end (122). In some embodiments, a hook (126) is located on the handle first end (121). In some embodiments, the corn on the cob ladle (110) comprises an elongated cylindrical trough (130) having a trough first side (131), a trough second side (132), a trough front (133), a trough back (134), an open trough top (135), and a planar trough bottom (136) perpendicularly located on the handle second end (122). In some embodiments, a plurality of apertures (140) is located on the trough bottom (136). In some embodiments, the trough first side (131) and the trough second side (132) each comprise a notch (150) centrally located therein for accommodating corn on the cob handles.

In some embodiments, the system (100) comprises an elongated corn dipping tank (160) comprising an open tank top (161) having a lid (167) pivotally located thereon, a tank bottom (162), a tank front side (163) having a window (170) centrally located therein, a tank back side (164) a tank first side (165), and a tank second side (166). In some embodiments, a piece of corn on the cob is placed in the trough (130). In some embodiments, the trough (130) is lowered into the dipping tank (160) for coating the piece of corn on the cob with butter.

In some embodiments, a water fill line (171) is located on the window (170).

In some embodiments, water is located in the dipping tank (160). In some embodiments, butter or margarine is located in the dipping tank (160). In some embodiments, a combination of butter or margarine and water is located in the dipping tank (160).

In some embodiments, a corn on the cob clamp (200) comprises a first elongated clamp handle (210) having a first handle first end (211) and a first handle second end (212) and a second elongated clamp handle (220) having a second handle first end (221) and a second handle second end (222). In some embodiments, the first elongated clamp handle (210) is pivotally joined to the second elongated clamp handle (220) at a first handle midsection (213) and a second handle midsection (223).

In some embodiments, a first finger loop (215) is located on the first handle first end (211) and a second finger loop (225) is located on the second handle first end (221). In some embodiments, the first finger loop (215) and the second finger loop (225) are designed for inserting fingers from a hand of a user.

In some embodiments, a first corn clamp (216) is located on the first handle second end (212) and a second corn clamp (226) is locates on the second handle second end (222). In some embodiments, in a first position the first finger loop (215) is pivoted toward the second finger loop (225) thereby moving the first corn clamp (216) toward the second corn clamp (226) to grip a piece of corn on the cob. In some embodiments, in a second position the first finger loop (215) is pivoted away from the second finger loop (225) thereby moving the first corn clamp (216) away from the second corn clamp (226) to release a piece of corn on the cob.

In some embodiments, the corn on the cob clamp (200) replaces the corn on the cob ladle (110) to be used with the dipping tank (160) in the butter application system (100).

As used herein, the term "about" refers to plus or minus 10% of the referenced number.

The disclosures of the following U.S. Patents are incorporated in their entirety by reference herein: U.S. Pat. No.: D 157,183; U.S. Pat. No. 7,396,176; U.S. Pat. No. 7,150,574; U.S. Pat. No. 5,858,089; U.S. Pat. No. 4,963,045; U.S. Pat. No. 4,301,762; U.S. Pat. No. 3,735,487; U.S. Pat. No. 3,308,269; and U.S. Pat. No. 2,808,020.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures.

The reference numbers recited in the below claims are solely for ease of examination of this patent application, and are exemplary, and are not intended in any way to limit the scope of the claims to the particular features having the corresponding reference numbers in the drawings.

What is claimed is:

1. A butter application system (100) for applying butter to corn on the cob, wherein the system (100) comprises:
   (a) a corn on the cob ladle (110) comprising:
      (i) an elongated ladle handle (120) having a handle first end (121) and a handle second end (122), wherein a hook (125) is disposed on the handle first end (121), and
      (ii) an elongated cylindrical trough (130) having a trough first side (131), a trough second side (132), a trough front (133), a trough back (134), an open trough top (135), and a planar trough bottom (136) perpendicularly disposed on the handle second end (122), wherein a plurality of apertures (140) is disposed on the trough bottom (136), wherein the trough first side (131) and the trough second side (132) each comprise a notch (150) centrally disposed therein for accommodating corn on the cob handles, and
   (b) an elongated corn dipping tank (160) comprising an open tank top (161) having a lid (167) pivotally disposed thereon, a tank bottom (162), a tank front side (163) having a window (170) centrally disposed therein, a tank back side (164), a tank first side (165), and a tank second side (166);

wherein a piece of corn on the cob is placed in the trough (130), wherein the trough (130) is lowered into the dipping tank (160) for coating the piece of corn on the cob with butter.

2. The system (100) of claim 1, wherein a water fill line (171) is disposed on the window (170).

3. The system (100) of claim 1, wherein water is disposed in the dipping tank (160).

4. The system (100) of claim 1, wherein butter or margarine is disposed in the dipping tank (160).

5. The system (100) of claim 1, wherein a combination of butter or margarine and water is disposed in the dipping tank (160).

\* \* \* \* \*